United States Patent
Scholl et al.

(10) Patent No.: US 6,815,484 B2
(45) Date of Patent: Nov. 9, 2004

(54) RUBBER MIXTURES CONTAINING 1,4-BUTENEDIOL (POLYETHER)

(75) Inventors: Thomas Scholl, deceased, late of Bergisch Gladbach (DE); by Ulrike Scholl, legal representative, Bergisch Gladbach (DE); by Philipp Scholl, legal representative, Bergisch Gladbach (DE); by Christine Scholl, legal representative, Bergisch Gladbach (DE); by Johannes Scholl, legal representative, Bergisch Gladbach (DE); Hermann-Josef Weidenhaupt, Pulheim (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/196,838

(22) Filed: Jul. 15, 2002

(65) Prior Publication Data

US 2003/0045619 A1 Mar. 6, 2003

(30) Foreign Application Priority Data

Jul. 18, 2001 (DE) .......................... 101 35 014

(51) Int. Cl.$^7$ ................................ C08K 5/05
(52) U.S. Cl. ..................... 524/388; 524/386; 524/380; 524/377; 524/378
(58) Field of Search .............. 525/384, 385; 525/331.9; 152/209.1

(56) References Cited

U.S. PATENT DOCUMENTS

| | | | |
|---|---|---|---|
| 3,842,111 A | 10/1974 | Meyer-Simon et al. | 260/448.2 E |
| 3,873,489 A | 3/1975 | Thurn et al. | 260/33.6 AQ |
| 3,978,103 A | 8/1976 | Meyer-Simon et al. | 260/448.8 R |
| 4,076,550 A | 2/1978 | Thurn et al. | 106/288 Q |
| 4,343,339 A * | 8/1982 | Schwindt et al. | 152/209.1 |
| 4,709,065 A | 11/1987 | Yoshioka et al. | 556/428 |
| 4,766,252 A * | 8/1988 | Vara et al. | 568/616 |
| 5,565,275 A * | 10/1996 | Schmidt et al. | 428/483 |
| 5,663,226 A | 9/1997 | Scholl et al. | 524/262 |
| 5,703,151 A | 12/1997 | Yamamoto et al. | 524/262 |
| 5,717,022 A | 2/1998 | Beckmann et al. | 524/493 |
| 6,130,277 A | 10/2000 | Okamura et al. | 524/306 |
| 6,174,951 B1 * | 1/2001 | Scholl | 524/492 |
| 6,251,976 B1 | 6/2001 | Scholl et al. | 524/386 |
| 6,268,421 B1 | 7/2001 | Dittrich et al. | 524/266 |
| 2001/0031822 A1 | 10/2001 | Scholl et al. | 524/493 |

FOREIGN PATENT DOCUMENTS

| | | | |
|---|---|---|---|
| CA | 2186060 | 3/1997 | |
| DE | 199 14 848 | 10/2000 | |
| DE | 199 29 788 | 11/2000 | |
| GB | 1575115 | 9/1980 | |
| JP | 2003-105140 A * | 4/2003 | C08L/21/00 |
| WO | WO 98/47955 A1 * | 10/1998 | C08K/9/02 |

OTHER PUBLICATIONS

Houben–Weyl, Methoden Der Organishchen Chemie, vol. XIV/2, (month unavailable) 1963, pp. 436–440 and p. 450, R. Wegler, Polyadditions–und Polymerisationsprodukte von heterocycl. Monomoren.

* cited by examiner

*Primary Examiner*—David W. Wu
*Assistant Examiner*—Rip A Lee
(74) *Attorney, Agent, or Firm*—Jennifer R. Seng; Godfried R. Akorli

(57) ABSTRACT

The present invention relates to rubber mixtures with improved processing behavior and high filler activity, containing 1,4-butenediol and/or 1,4-butenediol polyether, as well as the use of the rubber mixtures for the production of vulcanizates, in particular for the production of highly reinforced, abrasion-resistant molded articles, and preferably for the production of tires that have a low rolling resistance and a high abrasion resistance.

4 Claims, No Drawings

RUBBER MIXTURES CONTAINING 1,4-BUTENEDIOL (POLYETHER)

FIELD OF THE INVENTION

The present invention relates to rubber mixtures that contain, in addition to at least one rubber, also 1,4-butenediol and/or 1,4-butenediol polyether as well as fillers, as well as the use of the rubber mixtures for the production of vulcanizates, in particular for the production of highly reinforced, abrasion-resistant molded articles, more preferably for the production of tires that have a low rolling resistance and a high abrasion resistance.

BACKGROUND OF THE INVENTION

A number of proposed solutions have been elaborated for producing tires having a reduced rolling resistance. Specific polysulfide silanes as reinforcing additives for silicic acid-containing rubber vulcanizates have been described in DE-A-2 255 577 and 4 435 311, EP-A1 0 670 347 as well as U.S. Pat. No. 4,709,065. However, a disadvantage of the use of the polysulfide silanes described there as reinforcing additives for silicic acid-containing rubber vulcanizates is that relatively large amounts of the expensive polysulfide silanes have to be used in order to achieve an acceptable compatibility.

In order to improve the processing of silicic acid-containing rubber mixtures, further additives have been proposed such as fatty acid esters, fatty acid salts or mineral oils. The aforementioned additives have the disadvantage that they raise the flowability but at the same time reduce the tensile modulus values at relatively large elongation (e.g. 100% to 300%), with the result that the reinforcing action of the filler is impaired.

It has also been known to add polyalcohols and polyglycols to rubber mixtures. For example, rubber mixtures that contain specific polyethylene oxides are described in EP-A1 0 869 145 and EP-A1 0 738 755. The structures of the polyethers used are not disclosed. According to the teaching of the specified documents the aforementioned polyethylene oxides scarcely improve the processability of the unvulcanized rubber mixtures, but affect in particular the properties of the vulcanizates, in particular the antistatic properties and the abrasion behavior.

Rubber mixtures containing specific 1,2-diols and 1,3-diols are known from EP-A 761 734. These rubber mixtures containing 1,2-diols and 1,3-diols tend however to stick to the roller and have an adverse effect on the mechanical properties of the vulcanizates.

SUMMARY OF THE INVENTION

Accordingly, the object of the present invention was to provide additives that, inter alia, improve the flowability of rubber mixtures without however reducing the activity of the fillers contained in the mixtures, and to provide vulcanizates having good properties, in particular with respect to abrasion, rolling resistance and wet anti-skid properties in tires.

It has now been found that 1,4-butenediol and 1,4-butenediol polyethers significantly improve the flowability of rubber mixtures and lead to vulcanizates having a good reinforcing behavior, favorable dynamic damping and good abrasion behavior.

Accordingly, the present invention provides rubber mixtures containing at least one rubber, 0.05 to 25 parts by weight with respect to 100 parts by weight of employed rubber, of 1,4-butenediol or 1,4-butenediol polyether or mixtures thereof, the butenediol polyether corresponding to the structure

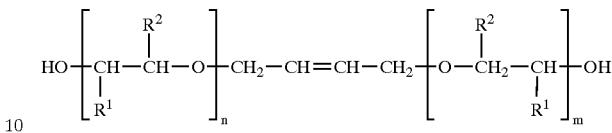

wherein $R^1$ and $R^2$ independently of one another denote hydrogen or a $C_1$ to $C_4$ alkyl radical, preferably methyl or ethyl, and n and m independently of one another denote integers from 0 to 10, preferably 0 to 5, with the proviso that n and m cannot at the same time be 0, as well as 1 to 500 parts by weight of filler referred to 100 parts by weight of employed rubber.

Preferably, butenediols or their polyethers are used that contain 0.1 to 10 moles of ethylene oxide and/or propylene oxide per hydroxyl group, more preferably 0.7 to 7 moles of ethylene oxide and/or propylene oxide per mole of hydroxyl groups, and that have molecular weights in the range from 88 to 1500, preferably in the range from 88 to 700. Most preferably, the corresponding polyethers are based on cis-1,4-butenediol. The production of such addition products and polyaddition products of 1,4-butenediol is known in the prior art and is described for example in Houben-Weyl, Methoden der Organischen Chemie, Vol. XIV/2, Thieme Verlag, Stuttgart, 1963 pp. 436–440 and p. 450. Such polyethers are also commercially available and, depending on their production, are preferably used as a mixture of the corresponding polyethylene oxides and polypropylene oxides. Preferably, the rubber mixtures according to the present invention contain the 1,4-butenediol or its polyether of the above formula in amounts of 0.3 to 15 parts by weight, in particular, in amounts of 0.5 to 6 parts by weight, most preferably in amounts of 1 to 5 parts by weight.

The rubbers to be used for the production of the rubber mixtures according to the present invention include natural rubber and synthetic rubbers. Preferred synthetic rubbers are for example described in W. Hofmann, Kautschuktechnologie, Genter Verlag, Stuttgart 1980. These synthetic rubbers include, inter alia

| | |
|---|---|
| BR— | polybutadiene |
| ABR— | butadiene/acrylic acid $C_1$–$C_4$ alkyl ester copolymers |
| CR— | polychloroprene |
| IR— | polyisoprene |
| SBR— | stirene/butadiene copolymers with stirene contents in the range from 1 to 60 wt. %, preferably in the range from 20 to 50 wt. % |
| IIR— | isobutylene/isoprene copolymers |
| NBR— | butadiene/acrylonitrile copolymers with acrylonitrile contents in the range from 5 to 60 wt. %, preferably in the range from 10 to 40 wt. % |
| HNBR— | partially hydrogenated or completely hydrogenated NBR rubber |
| EPDM— | ethylene/propylene/diene copolymers | as well as mixtures of these rubbers.

Mixtures of, in particular, natural rubber, emulsion SBR rubber as well as solution SBR rubber and polybutadiene rubber are of importance in the production of vehicle tires. Of particular interest is the use of solution SBR rubbers with a vinyl content in the range from 20 to 60 wt. % as well as polybutadiene rubbers with a high 1,4-cis content (>90%) that have been produced using catalysts based on nickel, cobalt, titanium and/or neodymium, as well as polybutadiene rubber with a vinyl content of up to 75 wt. % as well as the mixtures of the aforementioned solution SBR and polybutadiene rubbers. Most preferred are corresponding solution SBR and polybutadiene rubbers with an additional content of bound functional groups, in particular hydroxyl and/or carboxyl groups. Preferred contents of hydroxyl and/or carboxyl groups are in the range from 0.05 to 3 wt. % with respect to the rubber. More preferred rubbers according to the present invention are described, for example, in German patent applications DE-A1 19 832 549, DE-A1 19 852 648, DE-A1 19 914 848, DE-A1 19 920 788, DE-A1 19 920 814 as well as DE-A 2 653 144 and EP A1 0 464 478.

Furthermore, the rubber mixtures according to the present invention preferably contain 5 to 300 parts by weight of fillers. Particularly suitable as fillers are oxidic and/or silicate fillers and/or carbon blacks. Oxidic and/or silicate fillers are preferred.

The following suitable oxidic and/or silicate fillers are preferably used:

Highly dispersed silicic acid produced, for example, by precipitating solutions of silicates or by flame hydrolysis of silicates, silicon halides with specific surfaces in the range from 5 to 1000 $m^2/g$, preferably in the range from 20 to 400 $m^2/g$ (BET surface) and with a primary particle size in the range from 10 to 400 nm. The silicic acids may optionally also be present as mixed oxides with other metal oxides such as Al, Mg, Ca, Ba, Zn, Zr, Ti oxides.

Synthetic silicates such as aluminum silicate, alkaline earth silicates such as magnesium silicate or calcium silicate with BET surfaces in the range from 20 to 400 $m^2/g$ and primary particle diameters in the range from 10 to 400 nm.

Natural silicates such as kaolin and other naturally occurring silicic acids.

Glass fibers and glass fiber products (mats, strands) or micro glass spheres.

Metal oxides such as zinc oxide, calcium oxide, magnesium oxide, aluminum oxide.

Metal carbonates such as magnesium carbonate, calcium carbonate, zinc carbonate.

Metal hydroxides such as aluminum hydroxide, magnesium hydroxide.

As has already been mentioned, carbon blacks are also suitable as fillers. These carbon blacks are produced by the lampblack, furnace or carbon black process and generally have BET surfaces of 20 to 200 $m^2/g$, such as for example SAF, ISAF, HAF, FEF or GPF carbon blacks.

A mixture of 10 to 100 parts by weight of oxidic and/or silicate fillers and 5 to 50 parts by weight of carbon black, with respect to 100 parts by weight of employed rubber, are preferably used as fillers in the rubber mixtures according to the present invention.

For the production of rubber vulcanizates, the known and conventional rubber auxiliary substances may also be added to the rubber mixtures according to the present invention, in particular vulcanization accelerators, anti-aging agents, heat stabilizers, light stabilizers, ozone stabilizers, processing auxiliary substances, plasticizers, tackifiers, blowing agents, dyes, pigments, waxes, extenders, organic acids, retarding agents, metal oxides, crosslinking agents as well as activators. In this connection, reference may be made to I. Franta, Elastomers and Rubber Compounding Materials, Elsevier 1989, pp. 325–494.

The rubber auxiliary substances are used in conventional amounts that are governed by, inter alia, the intended use. Conventional amounts are, for example, amounts in the range from 0.1 to 50 wt. % referred to the total amount of employed rubbers.

Furthermore, the known crosslinking agents such as sulfur, sulfur donors or peroxides may also be used in the production of rubber vulcanizates. Vulcanization accelerators such as mercaptobenzthiazoles, guanidines, thiuranes, dithiocarbamates, thioureas and/or thiocarbonates may obviously also be added to the rubber mixtures according to the present invention. The vulcanization accelerators and crosslinking agents are used in amounts in the range from 0.1 to 10 wt. %, preferably in the range from 0.1 to 5 wt. %, with respect to the total amount of employed rubbers.

In a more preferred embodiment, the rubber mixtures according to the present invention contain, besides the aforementioned rubbers, fillers, 1,4-butenediol and/or 1,4-butenediol polyether, rubber auxiliary substances and crosslinking agents, also sulfur-containing silyl ethers as filler activators in an amount ranging from 0.5 to 15 parts by weight with respect to 100 parts by weight of employed rubbers, in particular bis-(trialkoxysilylalkyl)-polysulfides as described in DE-A-2 141 159 and DE-A-2 255 577, and/or oligomeric and/or polymeric sulfur-containing silyl ethers as described in DE-A-4 425 311 and EP-A1-0 670 347, and/or mercaptoalkyl trialkoxy silanes such as mercaptopropyltriethoxy silane, and/or thiocyanatoalkylsilyl ethers, as described in DE-A-1 9 544 469.

The rubber mixtures according to the present invention may be produced in the conventional types of apparatus such as mixing units, in particular rollers, internal mixers and mixer-extruders.

The vulcanization of the rubber mixtures according to the present invention may normally take place at temperatures in the range from 100° to 200° C., preferably in the range from 130° to 180° C., optionally at pressures in the range from 10 to 200 bar.

The rubber mixtures according to the present invention containing 1,4-butenediol and/or 1,4-butenediol polyether are characterized in particular by a good flowability, high processing reliability as well as improved vulcanization kinetics, and provide vulcanizates with high tensile modulus values. The rubber mixtures are, therefore, particularly suitable for the inexpensive production of highly reinforced, corrosion-resistant molded articles, in particular tires and tire components.

The following may, in particular, be mentioned as molded articles: cable sheathings, hoses, drive belts, conveyor belts, roller coatings, tires, shoe soles, sealing rings and damping elements. The rubber mixtures according to the present invention are most preferably used for producing tire treads with low rolling resistance.

EXAMPLE

The polyethers based on 1,4-butenediol can be produced according to the instructions given in Houben-Weyl, Methoden der Organischen Chemie, Vol. XIV/2, Thieme Verlag, Stuttgart, 1963, pp. 436–440, 450. The specified amounts refer to parts by weight.

The following rubber mixtures were produced in a 1.5 l capacity internal mixer (70 rpm, starting temperature 80° C., 5 minutes' mixing time). At the end of the mixing time, sulfur and accelerators were then mixed in on a roller (temperature: 50° C.).

TABLE

| | Comparison A | Example 1 |
|---|---|---|
| L-SBR BUNA VSL 5025-1 (oil extended rubber from Bayer AG) | 96 | 96 |
| BR rubber Buna CB24 (Bayer AG) | 30 | 30 |
| Vulkasil ® S (precipitated silicic acid from Bayer AG) | 80 | 80 |
| Russ Corax ® N 339 | 6.5 | 6.5 |
| Silan Si ® 1849-1 (aromatic mineral oil from BP) | 8 | 8 |
| ZnO | 2.5 | 2.5 |
| Stearic acid | 1 | 1 |
| Vulkanox ® 4020 (Bayer AG) | 1 | 1 |
| Ozone protection wax Antilux ® 654 (Rheinchemie) | 1.5 | 1.5 |
| 4.2 × propoxylated cis-1,4-butenediol, mean molecular weight 330, OH number 340, viscosity 60 cP at 25° C. | 0 | 4 |
| Sulfur | 1.5 | 1.5 |
| Vulkacit ® CZ (sulfenamide accelerator from Bayer AG) | 1.5 | 1.5 |
| Vulkacit ® D (diphenylguanidine accelerator from Bayer AG) | 2 | 2 |
| Mixing viscosities ML 1 + 4 at 100° C.: | 99 | 88 |
| Mooney prevulcanization in minutes, t5/130° C. (DIN 53.523) | 17.1 | 19.5 |
| Rheovulcameter (180° C./90 bar/3 minutes), volume in ml | 0.74 | 1.1 |
| Vulcanization at 160° C./28 minutes | | |
| Tensile strength (MPa) | 18.8 | 19.6 |
| Elongation at break (%) | 386 | 413 |
| Tensile modulus value at 300% elongation (MPa) | 12.9 | 13.9 |
| Rebound elasticity at 23° C. (%) | 32 | 32 |
| Tear-propagation resistance in N/mm (DIN 53 515) | 36.9 | 53.5 |
| Abrasion in ccm (DIN 53 516) | 75 | 77 |
| Shore hardness A at 23° C. | 68 | 68 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Rubber mixtures comprising at least one rubber, 0.05 to 25 parts by weight with respect to 100 parts by weight of employed rubber, of butenediol polyether corresponding to the structure

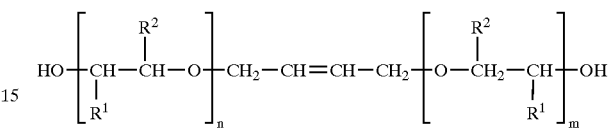

wherein

R$^1$ and R$^2$ independently of one another denote hydrogen or a C$_1$ to C$_4$ alkyl radical, and n and m independently of one another denote integers from 0 to 10 with the proviso that n and m cannot at the same time be 0, and 1 to 500 parts by weight of filler with respect 100 parts by weight of employed rubber.

2. A rubber mixture according to claim 1, wherein said n and m, independently of one another denote integers from 0 to 5.

3. Vulcanizates and rubber molded articles comprising a rubber mixture according to claim 1.

4. Vulcanizates and rubber molded articles according to claim 3, wherein said vulcanizate and rubber molded article is a tire or tire component.

* * * * *